US00RE44364E

(19) United States
(12) Reissued Patent
Cristy et al.

(10) Patent Number: US RE44,364 E
(45) Date of Reissued Patent: *Jul. 9, 2013

(54) METHOD OF ENCRYPTING INFORMATION FOR REMOTE ACCESS WHILE MAINTAINING ACCESS CONTROL

(75) Inventors: John J. Cristy, Landenberg, PA (US); David A. Pensak, Wilmington, DE (US); Steven J. Singles, Newark, DE (US)

(73) Assignee: EMC Corporation, Pleasanton, CA (US)

( * ) Notice: This patent is subject to a terminal disclaimer.

(21) Appl. No.: 11/129,746

(22) Filed: May 16, 2005

Related U.S. Patent Documents

Reissue of:
(64) Patent No.: 6,449,721
Issued: Sep. 10, 2002
Appl. No.: 09/985,096
Filed: Nov. 1, 2001

U.S. Applications:
(60) Continuation of application No. 10/936,829, filed on Sep. 9, 2004, now Pat. No. Re. 41,186, which is a division of application No. 09/906,811, filed on Jul. 18, 2001, now Pat. No. 6,339,825, which is a division of application No. 09/321,839, filed on May 28, 1999, now Pat. No. 6,289,450.

(51) Int. Cl.
*H04L 29/06* (2006.01)
*G06F 7/04* (2006.01)

(52) U.S. Cl.
USPC ..... 713/150; 726/27

(58) Field of Classification Search
USPC ..... 713/150; 726/27
See application file for complete search history.

(56) References Cited

U.S. PATENT DOCUMENTS

| | | | |
|---|---|---|---|
| 4,605,820 | A | 8/1986 | Campbell, Jr. |
| 4,803,108 | A | 2/1989 | Leuchten et al. |
| 4,937,863 | A | 6/1990 | Robert et al. |
| 5,058,164 | A | 10/1991 | Elmer et al. |
| 5,098,124 | A | 3/1992 | Breed et al. |
| 5,263,157 | A | 11/1993 | Janis |
| 5,349,893 | A | 9/1994 | Dunn |
| 5,356,177 | A | 10/1994 | Weller |
| 5,410,598 | A | 4/1995 | Shear |

(Continued)

*Primary Examiner* — Jacob Lipman
(74) *Attorney, Agent, or Firm* — Novak Druce Connolly Bove + Quigg LLP

(57) ABSTRACT

The invention provides for encrypting electronic information such as a document so that only users with permission may access the document in decrypted form. The process of encrypting the information includes selecting a set of policies as to who may access the information and under what conditions. A remote server stores a unique identifier for the information and associates an encryption/decryption key pair and access policies with the information. Software components residing on the author's computer retrieve the encryption key from the remote server, encrypt the information, and store the encrypted information at a location chosen by the author. A user wishing to access the information acquires the encrypted information electronically. Software components residing on the viewing user's computer retrieve the associated decryption key and policies, decrypt the information to the extent authorized by the policies, and immediately delete the decryption key from the viewing user's computer upon decrypting the information and rendering the clear text to the viewing user's computer screen. The software components are also capable of prohibiting functional operations by the viewing user's computer while the clear text is being viewed.

12 Claims, 2 Drawing Sheets

U.S. PATENT DOCUMENTS 5,432,849 A 7/1995 Johnson et al.
5,438,508 A 8/1995 Wyman
5,440,631 A 8/1995 Akiyama et al.
5,509,070 A 4/1996 Schull
5,544,161 A * 8/1996 Bigham et al. ..... 370/397
5,586,186 A 12/1996 Yuvall et al.
5,629,980 A 5/1997 Stefik et al.
5,673,316 A 9/1997 Auerbach et al.
5,689,560 A 11/1997 Cooper et al.
5,689,565 A * 11/1997 Spies et al. ..... 713/189
5,708,709 A 1/1998 Rose
5,727,065 A 3/1998 Dillon
5,754,646 A 5/1998 Williams et al.
5,765,152 A 6/1998 Erickson
5,796,825 A 8/1998 McDonnal et al.
5,809,145 A 9/1998 Slik et al.
5,818,936 A 10/1998 Mashayekhi
5,822,524 A 10/1998 Chen et al.
5,883,955 A 3/1999 Ronning
5,933,498 A 8/1999 Schneck et al.
5,956,034 A 9/1999 Sachs et al.
5,978,475 A * 11/1999 Schneier et al. ..... 713/177
5,997,077 A 12/1999 Siebels et al.
6,002,772 A 12/1999 Saito
6,064,736 A 5/2000 Davis et al.
6,134,660 A * 10/2000 Boneh et al. ..... 713/193
6,182,220 B1 1/2001 Chen et al.
6,245,408 B1 6/2001 Bitzer
6,289,450 B1 9/2001 Pensak et al.
6,308,256 B1 10/2001 Folmsbee
6,339,825 B2 1/2002 Pensak et al.
6,449,721 B1 9/2002 Pensak et al.
6,499,106 B1 12/2002 Yaegashi et al.
6,547,280 B1 4/2003 Ashmead
6,682,128 B2 1/2004 Carroll et al.
6,711,553 B1 3/2004 Deng et al.
6,732,106 B2 5/2004 Okamoto et al.
6,912,285 B2 6/2005 Jevans

* cited by examiner

METHOD OF ENCRYPTING INFORMATION FOR REMOTE ACCESS WHILE MAINTAINING ACCESS CONTROL

Matter enclosed in heavy brackets [ ] appears in the original patent but forms no part of this reissue specification; matter printed in italics indicates the additions made by reissue.

[This application is a division of U.S. patent application Ser. No. 09/906,811, filed Jul. 18, 2001, which is a division of U.S. patent application Ser. No. 09/321,839, filed May 28, 1999, now U.S. Pat. No. 6,289,450.] *This application is continuation of Reissue patent application Ser. No. 10/936,829 filed Sep. 9, 2004, which is a broadening reissue of application Ser. No. 09/985,096, filed on Nov. 1, 2001, now U.S. Pat. No. 6,449,721, which application is a division of application Ser. No. 09/906,811, filed on Jul. 18, 2001, now U.S. Pat. No. 6,339,825, which is a division of application Ser. No. 09/321, 839, filed on May 28, 1999, now U.S. Pat. No. 6,289,450.*

BACKGROUND

This invention relates to an electronic security system for electronic objects such as documents, video and audio clips and other objects that can be transmitted via a network.

Electronic security systems have been proposed for managing access to electronic information and electronic documents so that only authorized users may open protected information and documents. Several software tools have been developed to work with particular document readers such as Adobe Acrobat Exchange and Adobe Acrobat Reader.

A need still exists for improved systems for providing access to encrypted information by authorized users and which prevent unauthorized users from gaining access to the encrypted information. The present invention allows the authoring user or other controlling party to maintain access control over the electronic information.

SUMMARY

The preferred embodiment(s) of the invention are summarized here to highlight and introduce some aspects of the present invention. Simplifications and omissions may be made in this summary. Such simplifications and omissions are not intended to limit the scope of the invention.

The object of the present invention is to provide a system and method for encrypting electronic information so that access to the information can be controlled by the author or other controlling party.

A further object of the present invention is to provide an electronic encryption/decryption system and method in which a central server maintains control over the electronic encryption and decryption keys.

A further object of the present invention is to provide an electronic encryption/decryption system and method in which electronic encryption and decryption keys are not retained by an encrypting or decrypting party.

A further object of the present invention is to provide a system and method for encrypting electronic information so that access to the information can be dynamically changed from a single location without the necessity of collecting or redistributing the encrypted information.

A further object of the present invention is to provide an electronic encryption/decryption system and method in which access to electronic information can be permanently revoked by destroying the association of a decryption key to the electronic information.

These and other objects will become apparent from the figures and written description contained herein.

BRIEF DESCRIPTION OF THE DRAWINGS

Preferred embodiment(s) of the invention will be discussed below with reference to attached drawings in which.

DETAILED DESCRIPTION OF THE PREFERRED EMBODIMENT(S)

Figure 1:
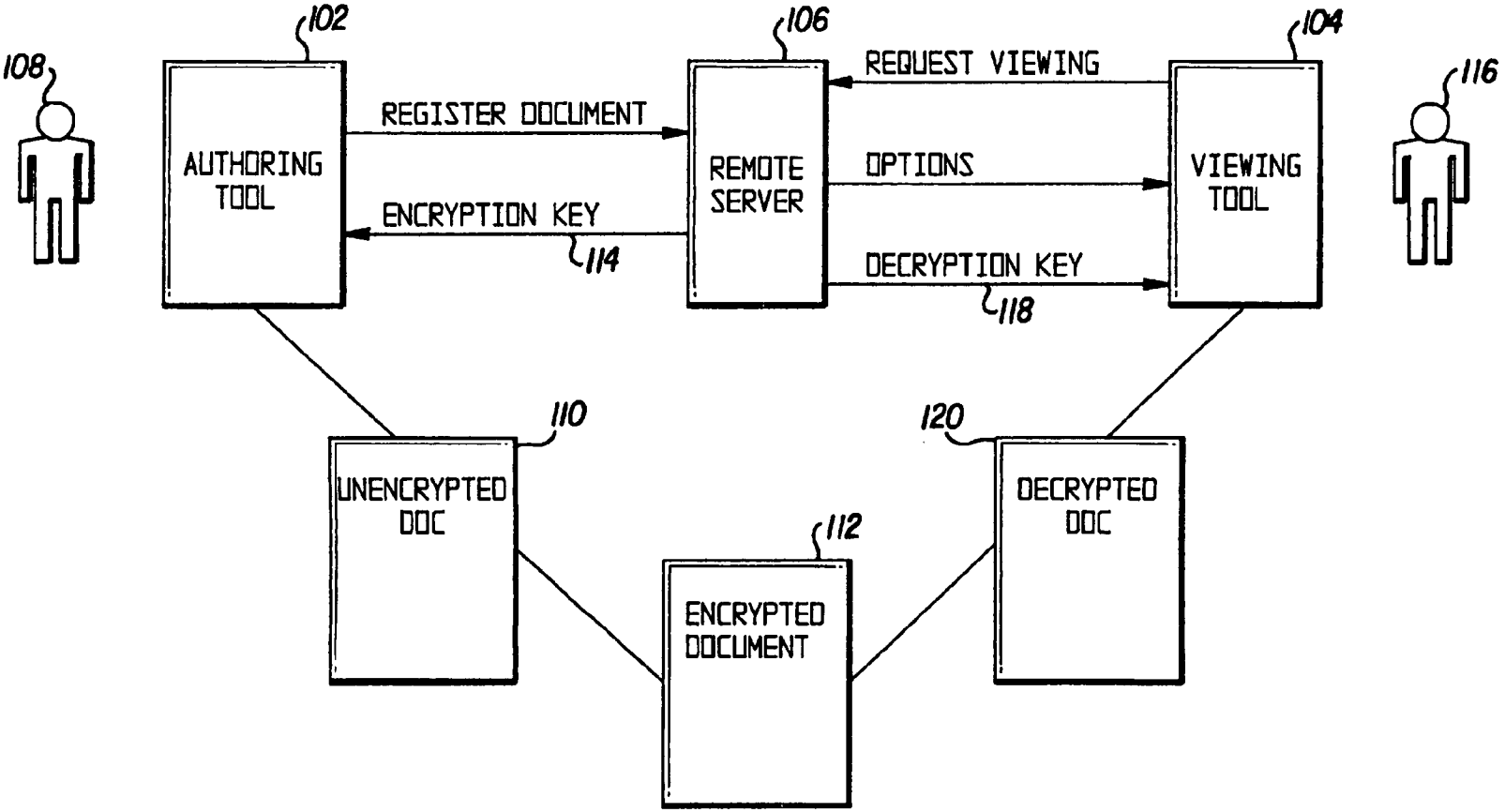
FIG. 1 is a block diagram illustrating a system configuration of an authoring tool, a viewing tool, and a remote server of the electronic encryption system.

Referring now to the Figures wherein like reference numerals indicate like elements, in FIG. 1, the system of the preferred embodiment can be broken down conceptually into three functional components: an authoring tool 102, a viewing tool 104, and a remote server 106. For convenience, the embodiments described herein are described with respect to a document in Adobe Acrobat Exchange, but other embodiments using other base software packages are possible. Other types of electronic information, as determined by the base software package chosen, can be encrypted using the present invention.

The authoring tool 102 allows an authoring user 108 to convert a text document 110 to unreadable form 112 using a strong encryption algorithm and an encryption key, or set of encryption keys, provided by the remote server 106. The authoring tool 102 also registers the electronic document or information with the remote server 106 and associates a set of access policies with the encryption key so that only selected viewing users 116 under selected circumstances may view the document in clear text. The document or information may also be broken down into segments using the authoring tool 102, so that certain segments within a document may have different access policies. For example, a set of users may be allowed to view pages 1-5 of a 10 page document in clear text, while a subset of those users may be allowed to view all 10 pages of the document. The authoring tool 102 also allows the authoring user 108 to block certain functions normally accessible by the viewing user 116. For example, the authoring user 108 may deny a viewing user 116 privileges such as printing and copying of the clear text.

The viewing tool 104 allows a viewing user 116 to decrypt the document 112 an authoring user 108 has encrypted, provided the authoring user 108 has associated an access policy with the decryption key which grants access to the clear text to the viewing user 116. The viewing tool 104 retrieves the decryption key 118 associated with the document segment 112 from the remote server 106, decrypts the document into clear text, renders the document segment, and destroys the decryption key and the clear text version of the document segment. The viewing tool 104 prevents the saving of the decryption key or the clear text version of the document. The viewing tool 104 also blocks the viewing user's machine from performing certain functions, such as printing or copying, as directed by the authoring user 108 during registration of the document 110.

The secure remote server 106 performs several functions. The remote server 106 generates encryption keys 114 for each document segment, maintains decryption keys 118 for registered encrypted documents 112, authenticates requests for viewing a document segment, grants access to registered documents 112 by providing decryption keys 118 and associated access policies to authorized viewing users 116, and maintains an encrypted secure central database which provides association between registered authoring users, registered documents, associated decryption keys, associated policies for each document, options for each user and document, and associated registered viewing users. The remote server 106 does not store or receive the actual document, either encrypted or unencrypted.

Figure 2:
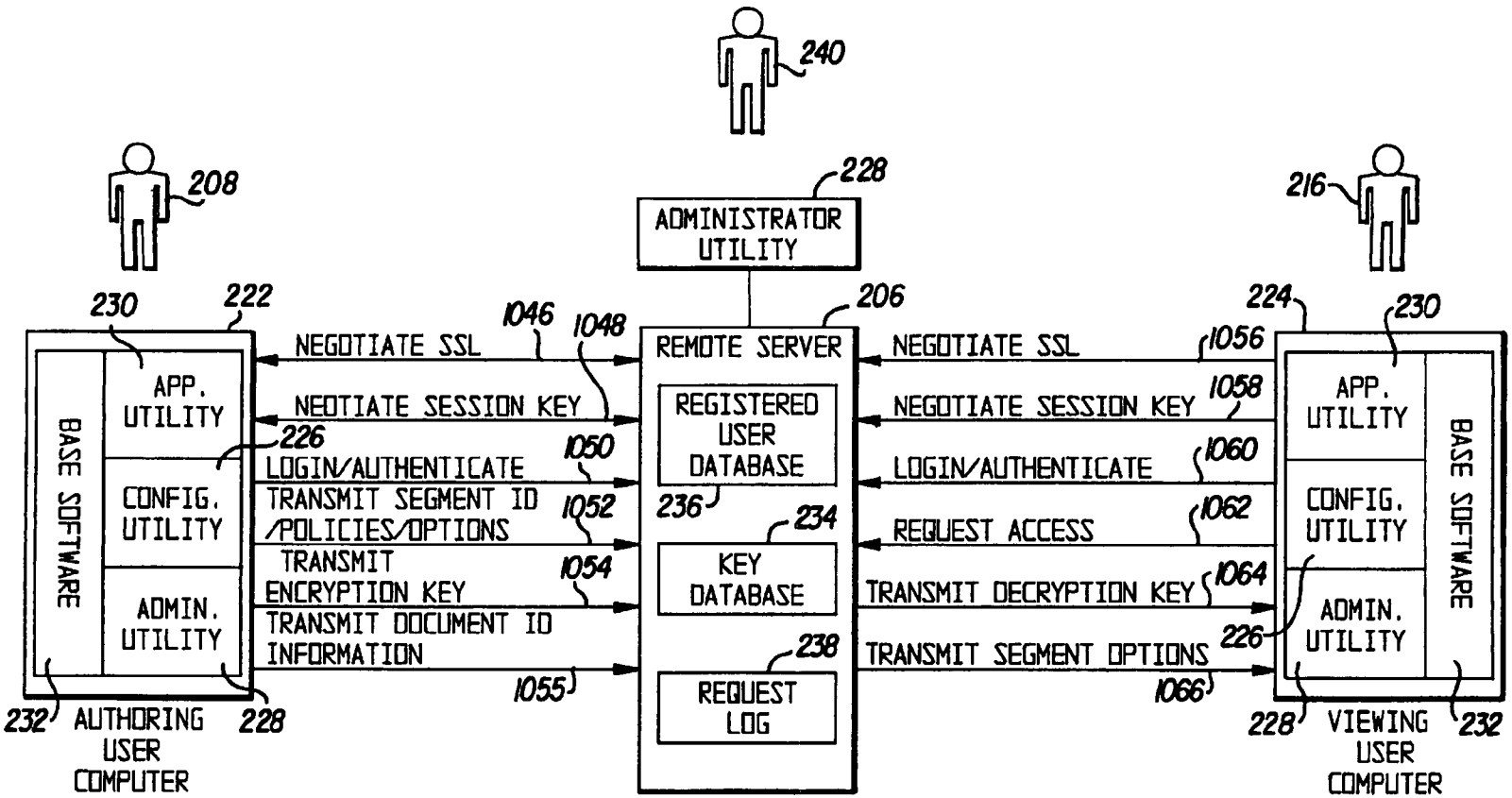
FIG. 2 is a block diagram illustrating a detailed system configuration and functions associated with each component of the electronic encryption system.

The authoring tool 102 and the viewing tool 104 each use essentially the same suite of software tools. As shown in FIG. 2, the software tools reside on the authoring and viewing users' computers 222, 224. Registration with the central remote server 206 determines which functions within the suite of software tools are available to a particular user. The software tools include a Configuration Utility 226, an Administrator Utility 228, and an Application Interface 230. In the embodiment using Adobe Acrobat Exchange, the Application Interface is a "Plug-In," which uses SDK and Plug-In Standard Interface. The,three software tools run in conjunction with base viewing or playback software 232, such as Adobe Acrobat Exchange, a web browser, a word processor, an audio or video playing application, a custom data processing, or a specialized low-level device driver, such as a hard disk driver, video driver, or audio driver. The base software package 232 will depend on the type of data stream to be encrypted/decrypted.

THE SECURE REMOTE SERVER

The secure remote server 206 is a server which is remote from an authoring or viewing user 208, 216. The server 206 maintains a database 236 of encryption keys and associated decryption keys for distribution to registered or authorized users. The remote server 206 also maintains a database which associates registered document segments, which are identified by unique segment IDs, with authoring users, user access profiles, document access policies and options, and associated encryption/decryption keys. The remote server 206 does not actually store registered documents or segments, but instead relates identifying information about a document to the associated information.

The remote server 206 also tracks and maintains records of requests to view documents and to obtain document decryption keys 238. The records may be used to monitor the system for suspicious activity. For example, a single user requesting the decryption key for a document several times during a specific time period might be an indication of suspicious activity. The server can then provide an alert message to a pager, e-mail or fax, thus allowing timely investigation of the activity. The request information may also be used for the purposes of non-repudiation or as a basis for billing in situations where access to the system or access to protected information is being sold.

All communication between the remote server 206 and a user's computer 222, 224 is encrypted using Secure Socket Layer (SSL) protocols. Once an SSL tunnel has been negotiated between a user's machine 222, 224 and the secure server 206, a session key is negotiated. Thus, communications to and from the secure server 206 and a user's computer 222, 224 are doubly encrypted.

Registration with the remote server 206 of a user or automated system wishing to use the system is done separately from any communication for registering a document or viewing a document. A user wishing to register documents for viewing by other users, or viewing registered document registered by other users, must contact the server independently, possibly through a separate human Coordinator 240 or separate network link which can collect payment for the authoring, viewing, and other services, can verify the identity of the user and provide the server with user identification information and user authorization profiles.

The server may be a single server, a set of synchronized servers, or dual servers with a shared database.

THE CONFIGURATION UTILITY

The Configuration Utility 226 defines a local user (authoring or viewing) on the user's computer 222, 224. The Configuration Utility 226 establishes the communication parameters for a local user and the remote server 206. For example, the Configuration Utility 226 will query the user to define a local user profile, to include name, password and other identifying information. This local user profile must match the information provided by a user to the Coordinator 240 at the remote server 206.

The Configuration Utility 226 is also responsible for maintaining information regarding the authentication and secure communication method used by the local user, for example, certificate, secret passphrase, smart card, etc. The Configuration Utility 226 maintains information about the local user's secure communication method, for example, the certificate and certification authority for a certificate based secure communication system.

THE ADMINISTRATOR UTILITY

The Administrator Utility 226 is a network client application used by the human Coordinator 240 and other users to control access to documents selected for encryption by defining policies associated with a document. The Administrator Utility 228 is a software program residing on the user's computer 222, 224. The Coordinator 240 or authoring user 208 uses the Administrator Utility 228 to define policies related to a particular user. For example, the Coordinator 240 can use the Administrator Utility 228 to control the functions available to a particular authoring user 208, which might depend on the fees paid by the authoring user 208, or the Coordinator 240 can control the amount of access an authoring user 208 can allow to viewing users 216. Other policies that an individual can define using the Administrator Utility 228 are site policies, group policies, and default policies.

The Administrator Utility 228 allows the Coordinator 240 or authoring or viewing user 208, 216 to determine what documents have been registered by a particular user by accessing the registered user database 236. The Administrator Utility 228 also allows an authoring user to permanently disable the viewing of documents by deleting the associated decryption key from the server. The Administrator Utility 228 also allows an authoring user 208 to initially define the policies related to his documents and to change the policies after the documents have initially been registered.

The Administrator Utility 228 allows a normal authoring user 208 to create, edit, and delete time windows, network specifications and policy templates; view the list of registered documents; and view and edit the policies of documents that are registered. The Administrator Utility 228 allows the Coordinator 240 to create, edit, and delete users and user policies; create, edit, and delete groups of users and group polices; create, edit, and delete document groups and document group policies; define and modify the Site and Default polices;

create, edit, and delete document override policies; and view the activity log and set up notification policies

THE APPLICATION INTERFACE

The Application Interface 230 of the preferred embodiment is a standard "Plug-In" to Adobe Acrobat Exchange using SDK and Plug-In Standard Interface. The Plug-In 230 provides a user screen interface to allow the user to access the particular functions associated with registering and viewing documents and communicating with the server. The Plug-In Screen may be integral to the Adobe User Interface Window or may be a separate window. In the preferred embodiment, the Plug-In 230 modifies the Adobe User Interface Window by adding functional "buttons" such as register, create policies, tag, encrypt, view and decrypt.

The Plug-In 230 allows encryption and decryption of PDF files using encryption keys from the remote server 206. The Plug-In 230 connects to the server 206, authenticates the user to the server, registers documents with the server, selects policies at the server as they have been defined -by the authoring user 208 using the Administrator Utility 228.

In addition, the Plug-In 230 blocks certain functions at the viewing user's computer 224 that are otherwise available in Adobe Acrobat Exchange. For example, if the authoring user 208 has limited access to a document so that a viewing user 216 is prohibited from printing a viewed document, the Plug-In 230 temporarily disables the print function of Adobe Acrobat Exchange. Among the functions that the Plug-In 230 can disable are print, copy, cut, paste, save, and other functions. Other functions may be disabled or limited as appropriate for the type of file viewed and the access level. The Application Interface 230 is designed in such a way that it does not disclose either the decryption key or the clear text or unencrypted representation of the protected information content in electronic form.

THE GRAPHICAL USER INTERFACE

The Graphical User Interface ("GUI")supports standard user interface objects such as push buttons, text input fields, lists, menus, and message boxes. The GUI is controlled by the mouse and keypad. The GUI has multiple windows that allow real time setup of server configuration such as who may register a document, who may view a document, when a document may be viewed and on which host the document key and viewing information resides.

INITIAL USER SETUP

A user who wishes to register or to access information must first register and be recognized by the server 206, as represented by reference numeral 1042, 1044 in FIG. 2. The user 208, 216 contacts the server 206 independently, possibly through a separate human Coordinator 240 or separate network link which can collect payment for the authoring, viewing and other services; verify the identity of the user; and provide the server with user identification information and user authorization profiles. Once the user 208, 216 is registered with the server 206, the suite of software tools is provided to the user.

The user must have installed the base software 230, such as Adobe Acrobat Exchange, on his computer. The user then installs the Application Interface 230 provided by the Coordinator 240, as well as the Administrator and Configuration Utilities 228, 226. In one embodiment, upon running the Application Interface 230, the Application Interface 230 will install the Administrator and Configuration Utilities 228, 226 on the user's machine. There is no network activity involved in the installation of the Application Interface 230, Administrator, or Configuration Utilities 228, 226.

CREATING POLICIES USING THE ADMINISTRATOR

Once a user 208, 216 is registered and the Configuration Utility 226 has set up identification and encryption information for the user 208, 216, the user authorized to do so can use the Administrator Utility 228 to create policies associated with a specific document. An authoring user 208 wishing to register a document creates policies to define who, when and how a document may be viewed or otherwise accessed.

The authoring user 208 runs the Administrator Utility 228 which has been installed on his machine 222 and instructs the Administrator Utility 228 to create policies for a document. The Administrator Utility 228 will request the information provided during set up to the Configuration Utility 226 such as username, passphrase, and method of authentication to verify the user's identity. The Administrator Utility 228 will also ask on which server the authoring user 208 wishes to register his document. The Administrator Utility 228 will then establish a connection to the remote server through the Application Interface 230.

The remote server 206 and the authoring or viewing user's computer 222, 224 communicating with the server 206 will negotiate a standard Secure Socket Layet (SSL) encryption tunnel, as represented in FIG. 2 by reference numerals 1046, 1056.

Once the SSL tunnel is established, the user's computer 222, 224 and the server 206 negotiate a secondary session key, as represented in FIG. 2 by reference numerals 1048, 1058. All subsequent communications is additionally encrypted using 128-bit RC4 and this secondary session key. All communication between the users' computers 222, 224 and the server 206 is thus doubly encrypted.

Once the doubly encrypted communication link is established between the authoring user's computer 222 and the server 206, the authoring user's computer 222 provides login and authentication information to the server 206, 1050. The server 206 authenticates the authoring user's 208 identity and verifies that the authoring user 208 has authority to use the system by checking a database of registered users 236 maintained on the server. The information provided by the authoring user 208 to the Configuration Utility 226 is compared to the information provided by the user to the Coordinator 240 during the independent user registration process 1042, 1044. The database 234 contains all of the access controls related to a particular user, so that if a user is only authorized to view documents, he will not be allowed to use the system to register or encrypt documents.

After the server 206 authenticates the authoring user 208 and verifies that the authoring user 208 is authorized to register documents, the Administrator Utility 228 allows the authoring user 208 to create policies applicable to a particular viewing user 216, a group of viewing users, or a default policy for all other users. The policies are then communicated to the server 206, 1051. Policies define who may view a document, when, and under what conditions. Policies are created by combining a set of constraints including allowable or denied users and groups, time ranges, and Internet Protocol (IP) addresses. Access to a document by a viewing user 216 is determined by combining the user policy, document policy, as well as possibly the group policy and document group policy. If the Coordinator 240 has created a document override policy for a document, then the override takes precedence over the regular document policy defined by the authoring user. Policies include limiting who may view a document or portion of a document and the time frame during which a user may view the document.

The Administrator Utility 228 also allows the authoring user 208 to create options. Options specify what functions of the base software 232 are temporarily disabled so that the viewing user 216 is prohibited from accessing them while viewing the document. An option can also enforce a watermark on printing. For example, the authoring user 208 can prohibit a particular viewing user 216 from printing, saving, or copying a particular document or portion of a document. These Options are defined by the authoring user 208 using the Administrator Utility 228, but the options are enforced by the Application Interface 230.

ENCRYPTING DOCUMENTS AND DATA STREAMS

An authoring user 208 wishing to encrypt a document will open the document on his computer 222. The Application Interface 230 must also be loaded before the document or information can be encrypted. In the preferred embodiment, the Plug-In 230 adds menu items to the menu bar in Adobe Acrobat Exchange such as "tag" and "encrypt" "Tag" allows the authoring user 208 to select segments of the document to be encrypted. The authoring user 208 can assign different policies to different tagged segments of a single document, i.e., policies are associated with segments. A segment may consist of any subset of the entire document or the entire document. Once the document has been segmented or "tagged," the authoring user selects "encrypt" from the menu bar. If the authoring user 208 has not already logged into the remote server 206, the Plug-In 230 will force a log in to the remote server 206 through the Administrator Utility 228. A log-in screen is provided and the authoring user 208 must log-in to the server 206. The server 206 authenticates the authoring user 208 and verifies that the authoring user 208 is authorized to register documents.

Once the authoring user has been authenticated, the authoring user is asked to associate the overall document with a policy, and this information is communicated to the remote server 1052. This policy becomes the default policy for any portions of the document which are not tagged and associated with a specific policy. The Plug-In 230 assigns a unique segment ID for each tagged segment after the authoring user has tagged all segments and has instructed the Plug-In 230 to go ahead with the encryption. The PlugIn 230 transmits the segment IDs to the server 206. The server 206 generates a random encryption key for each segment ID and communicates the encryption key to the authoring user's computer 222, 1054. The server 206 stores the segment ID, the key associated with the particular segment ID, and the policy associated with a particular segment ID in the central database 234, and then transmits the key to the Plug-In 230 at the authoring user's computer 222. The Plug-In 230 at the authoring user's computer 222 encrypts the segment, immediately destroys or removes the key from the authoring user's machine 222, and then deletes the clear text for the segment from the Plug-In 230. Thus, key lifetime is very short on the authoring user's machine. The encryption key is never stored on the authoring user's machine where it is accessible, such as the hard disk. The key can even be obfuscated while in the memory of the authoring user's machine. The duration of the key's existence depends on the speed of the computer which actually performs the encryption, since the key is destroyed immediately after the encryption. In the preferred embodiment, 128-bit RC4 is used for document and segment encryption.

Once all segments have been encrypted, the Plug-In 230 produces a hash of the entire document and sends the hash to the server as document identification, 1055. The server 206 stores the hash with the keys associated with the document. Thus, the document is never transmitted to the server 206, only the segment IDs and hash.

A pop-up window asks the authoring user 208 where he wishes to store the encrypted document. By default, the encrypted document overwrites the clear text document on the authoring user's machine 222.

VIEWING REPLAYING AND DECRYPTING

A user wishing to view a document must have installed the Configuration Utility 226, Administrator Utility 228, and the Application Interface 230 on his computer 224. The viewing user 216 must be independently registered with the Coordinator 240 as a user. The viewing user 216 must also have installed the base software application 232 for viewing the document, such as Adobe Acrobat Exchange. The viewing user 216 must enter the Configuration Utility 226 and provide user set up information.

If the viewing user 216 has not opened the Configuration Utility 226, the Administrator Utility 228 and the Application Interface 230, these programs will automatically be opened once the information to be accessed has been selected, and the system has recognized that the information is encrypted.

Once the Configuration Utility 226 has opened, it will request the user to provide information defining both the viewing user 216 and the viewing user's computer 224. If the viewing user 216 is a new user, the viewing user 216 will select a button on the Configuration Utility's interface window indicating that a new user profile needs to be provided. The Configuration Utility 226 will provide a query screen to the user and the user will input identification information, such as a user name. The identification information will be checked against the information provided to the server 206 or Coordinator 240 during the independent user registration process.

The Application Interface 230 will check to see if the user is logged onto the remote server 206. If the viewing user 216 has not logged onto the remote server, the Application Interface 230 provides a pop-up window so that the user can log in to the server. An SSL tunnel and session key are negotiated, 1056, 1058. The viewing user's computer 224 provides login and authentication information to the server 206, 1060. Once logged into the server 206, the Application Interface 230 requests access to the document or information 1062 by asking the server 206 for the decryption key for the first segment of the document or information to be accessed. The server 206 uses the segment ID to check the database to find the policies associated with the segment and thus to determine whether the viewing user 216 is authorized to access this segment or the document as a whole.

If the viewing user 216 is not authorized to access the segment, the viewing user 216 is so informed. If the user 216 is authorized to access the segment, the server 206 sends the decryption key and options for that segment to the Application Interface 230 at the viewing user's computer 224 and the Application Interface 230 decrypts the segment using the decryption key. After decrypting the segment, the Application Interface 230 immediately discards/destroys the key, renders the decrypted segment to the screen, and then destroys the decrypted version of the segment. When the viewing user moves to a different segment, the process is repeated.

The Application Interface 230 enforces the options which were assigned by the authoring user 230 to the segment viewed by the viewing user 216. For example, if the authoring user 208 assigned that the viewing user 216 cannot print the clear text document or segment, then the Plug-In 230 disables the print function of Adobe Acrobat Exchange while the clear text document or segment is available to the viewing user 216. Other functions which can be controlled or disabled by the Plug-In 230 are save, copy, paste, and print with watermark. For other base software packages such as audio 230, the functions controlled by the Application Interface 230 could be play, copy, and save unencrypted. Thus, using the options, the viewing user 216 has no ability to permanently acquire the clear text document or data.

THE DATABASE

The secure central database 234 resides on the remote server 206. It may be a distributed or shared database residing on multiple remote servers 206. In the preferred embodiment the database 234 is maintained in Berkley DB software. All records maintained in the central database 234 are encrypted and the database is password protected. The Coordinator 240 controls the database 234 and has access to the database 234 using the password.

All keys for encryption and decryption are maintained in the database 234. The database 234 provides a structure for associating segment IDs with an associated decryption key, policies for accessing that segment, and options for accessing that segment. The authoring user 208 may change a policy associated with a segment ID through the Administrator Utility 228 on his computer. The change in policy is communicated to the remote server 206 and the database 234 is updated accordingly. The update policy function allows an authoring user 208 to revoke access to a segment or document by a user or group of users.

The authoring user 208 can destroy the decryption key or the association of a decryption key to a segment or document on the database 234 using the Administrator Utility 228. By destroying the decryption key or the association of the decryption key with a Segment or Document, the authoring user 208 destroys the ability to decrypt the information, effectively shredding all copies of the information.

Regular backups of the database 234 are made without shutting down the whole database 234.

One or more preferred embodiments have been described to illustrate the invention(s). Additions, modifications, and/or omissions may be made to the preferred embodiment(s) without departing from the scope or spirit of the invention (s). It is the intent that the following claims encompass all such additions, modifications, and/or variations to the fullest extent permitted by law.

What is claimed is:

[1. A method of controlling distribution of a segment of encrypted electronic information, comprising:

receiving, at a user location, a user code and an identification of the segment;

transmitting the user code and the identification from the user location to a key server;

receiving, at a user location from a key server in response to the user code representing a user authorized to view the segment, a decryption key for the segment and at least one access policy associated with the segment;

decrypting the segment with the decryption key into clear text in response to said receiving;

destroying the decryption key in response to said decrypting;

rendering the clear text;

limiting access to the clear text consistent with the at least one access policy; and defending the decryption key at the user location when the decryption key is resident at the user location;

wherein a processing between and including said receiving the decryption key and said destroying the decryption key occurs with sufficient speed such that the decryption key is only resident at the user location for a moment, and said defending resists capturing of the decryption key during the moment.]

[2. A method of controlling distribution of a segment of encrypted electronic information, comprising:

receiving, at a user location from a key server, a decryption key for the segment;

immediately decrypting the segment with the decryption key after said receiving;

immediately destroying the decryption key after to said decrypting; and defending the decryption key at the user location when the decryption key is resident at the user location;

wherein said receiving, said immediately decrypting and said immediately destroying only permit the decryption key to be resident at the user location for a brief moment in time, and said defending resists capture of the decryption key during the brief moment in time, such that it is difficult to improperly capture the decryption key at the user location.]

[3. A method of controlling distribution of a segment of encrypted electronic information, comprising:

receiving, at a user location from a key server, a decryption key for the segment;

decrypting the segment with the decryption key in response to said receiving;

destroying the decryption key in response to said decrypting; and defending the decryption key at the user location when the decryption key is resident at the user location;

wherein processing between and including said receiving and said destroying occurs with sufficient speed such that the decryption key is only resident at the user location for a moment, and said defending resists capture of the decryption key during the moment.]

[4. A method of controlling distribution of a segment of encrypted electronic information, comprising:

receiving, at a user location from a key server, a decryption key for the segment;

immediately decrypting the segment into clear text with the decryption key after said receiving;

immediately rendering said clear text on a display;

immediately destroying the decryption key after one of said decrypting and said rendering; and defending the decryption key at the user location when the decryption key is resident at the user location;

wherein said receiving, said immediately decrypting and said immediately destroying only permit the decryption key to be resident at the user location for a brief moment in time, and said defending resists capture of the decryption key during the brief moment in time, such that it is difficult to improperly capture the decryption key at the user location.]

[5. A method of controlling distribution of a segment of encrypted electronic information, comprising:

receiving, at a user location, a user code and an identification of the segment;

transmitting the user code and the identification to a server;

receiving, at a user location from a key server, a decryption key for the segment in response to the user code representing a user authorized to view the segment;

decrypting the segment with the decryption key in response to said receiving;

destroying the decryption key in response to said decrypting; and defending the decryption key at the user location when the decryption key is resident at the user location;

wherein a processing between and including said receiving the decryption key and said destroying the decryption key occurs with sufficient speed such that the decryption key is only resident at the user location for a moment, and said defending resists capturing of the decryption key during the moment.]

[6. A system for controlling access to a segment of encrypted electronic content, comprising:

a computer readable medium containing instructions designed to operate in conjunction with computer hardware and other computer software to:

receive, at a user location, a user code and an identification of the segment;

transmit the user code and the identification from the user location to a key server;

receive, at a user location from a key server in response to the user code representing a user authorized to view the segment, a decryption key for the segment and at least one access policy associated with the segment;

decrypt the segment with the decryption key into clear text in response to said receiving;

destroy the decryption key in response to said decrypting;

render the clear text;

limit access to the clear text consistent with the at least one access policy; and defend the decryption key at the user location when the decryption key is resident at the user location;

wherein said instructions require that computer processing between and including said receive the decryption key and said destroy the decryption key occurs with sufficient speed such that the decryption key is only resident at the user location for a moment, and said defend the decryption key resists capture of the decryption key during the moment.]

[7. A system for controlling access to a segment of encrypted electronic content, comprising:

a computer readable medium containing instructions designed to operate in conjunction with computer hardware and other computer software to:

receive, at a user location from a key server, a decryption key for the segment;

immediately decrypt the segment with the decryption key after said receiving;

immediately destroy the decryption key after said decrypting; and defend the decryption key at the user location when the decryption key is resident at the user location;

wherein the decryption key will only be resident at the user location for a brief moment in time, and said defend the key resists capture of the decryption key during the brief moment in time, such that it is difficult to improperly capture the decryption key at the user location.]

[8. A system for controlling access to a segment of encrypted electronic content, comprising:

a computer readable medium containing instructions designed to operate in conjunction with computer hardware and other computer software to:

receive, at a user location from a key server, a decryption key for the segment;

decrypt the segment with the decryption key in response to said receiving;

destroy the decryption key in response to said decrypting; and defend the decryption key at the user location when the decryption key is resident at the user location;

wherein said instructions require computer processing between and including said receive and said destroy to occur with sufficient speed such that the decryption key is only resident at the user location for a moment, and said defend resists capture of the decryption key during the moment.]

[9. A system for controlling access to a segment of encrypted electronic content, comprising:

a computer readable medium containing instructions designed to operate in conjunction with computer hardware and other computer software to:

receive, at a user location from a key server, a decryption key for the segment;

immediately decrypt the segment into clear text with the decryption key after said receiving;

immediately render said clear text on a display;

immediately destroy the decryption key in response to one of said decrypting and said rendering; and defend the decryption key at the user location when the decryption key is resident at the user location;

wherein the decryption key will only be resident at the user location for a brief moment in time, and said defend resists capture of the decryption key during the brief moment in time, such that it is difficult to improperly capture the decryption key at the user location.]

[10. A system for controlling access to a segment of encrypted electronic content, comprising:

a computer readable medium containing instructions designed to operate in conjunction with computer hardware and other computer software to:

receive, at a user location, a user code and an identification of the segment;

transmit the user code and the identification to a server;

receive, at a user location from a key server, a decryption key for the segment in response to the user code representing a user authorized to view the segment;

decrypt the segment with the decryption key in response to said receiving;

destroy the decryption key in response to said decrypting; and defend the decryption key at the user location when the decryption key is resident at the user location;

wherein said instructions require that computer processing between and including said receiving the decryption key and said destroying the decryption key occurs with sufficient speed such that the decryption key is only resident at the user location for a moment, and said defend resists capturing of the decryption key during the moment.]

*11. A method of controlling distribution of an encrypted segment of electronic information, comprising:*

*receiving, at a user location from a remote server, a key capable of decrypting the encrypted segment, and at least one policy limitation associated with the segment;*

*generating, at the user location, a decrypted version of the encrypted segment using at least a single-use copy;*

*limiting use of the decrypted version of the encrypted segment at the user location consistent with the at least one policy limitation; and*

*preventing the single-use copy of a key from being used more than once to decrypt the encrypted segment, such that attempting to re-access the encrypted segment requires obtaining a new copy of the key.*

*12. The method of claim 11 further comprising making the key unusable at the remote server, such that the encrypted segment becomes inaccessible absent breaking the underlying encryption methodology.*

*13. The method of claim 12, wherein said making the key unusable comprises destroying the key or disassociating the key from the encrypted segment.*

*14. The method of claim 11, further comprising:*

*sending, from the user location to a remote server and before said receiving, a request to access the encrypted segment; and*

*logging the request to thereby create a record of attempts to access the encrypted segment;*

*wherein as a result of said logging a record is created of activity relating to the encrypted segment.*

*15. A method of controlling distribution of electronic information, comprising:*

*receiving, from a remote location, a single-use copy of a key capable of decrypting a segment of encrypted electronic information, and at least one policy limitation assigned to the segment;*

*accessing, at the user location, the segment using the single-use copy of a key, said accessing being consistent with the at least one policy limitation; and*

*rendering the decrypted segment;*

*wherein the single-use copy of a key cannot be used more than once to access the encrypted segment.*

*16. A method of controlling distribution of electronic information, comprising:*

*attempting to access, at a user location, an encrypted segment of encrypted electronic information;*

*sending, from the user location to a remote location, a request to access the encrypted segment of electronic information;*

*receiving, from a remote location, a single-use copy of a decryption key for the segment;*

*accessing, at the user location, the encrypted segment using single-use copy of the decryption key;*

*displaying a displayable portion of the encrypted segment as accessed; and*

*destroying the single use copy of the decryption key;*

*wherein the single use copy of the decryption key can only be used once, and a user who wishes to re-access the segment of encrypted electronic information at the user location must obtain a new copy of the decryption key.*

*17. A method of controlling distribution of electronic information, comprising:*

*first receiving, at a user location from a remote location, a first single-use authorization to access an encrypted segment of electronic information;*

*first accessing, at the user location, the encrypted segment using the first single-use authorization;*

*attempting at the user location to re-access the encrypted segment;*

*second receiving at the said user location in response to said attempting at a user location, a second single-use authorization to access the encrypted segment of electronic information;*

*second accessing, at the user location, the encrypted segment using the second single-use authorization;*

*wherein the first single-use authorization can only be used once, such that the encrypted segment cannot be re-accessed using the first single-use authorization.*

*18. A method of controlling distribution of an encrypted segment of electronic information, the encrypted segment having a plurality of sets of access policies associated therewith, each set including at least one access policy, the method comprising:*

*sending, from the user location to a remote location, a request to access the encrypted segment of electronic information, the request being associated with a specific requestor;*

*receiving, at a user location from the remote location, a single-use copy of a decryption key for the encrypted segment, and a set of access policies from the plurality of sets of access policies, the set being associated with the specific requester;*

*decrypting, at the user location, the encrypted segment using the single-use copy of the decryption key;*

*using the decrypted version of the encrypted segment at the user location consistent with the set of access policies; and*

*preventing the single-use copy of the decryption key from being used more than once to decrypt the encrypted segment.*

*19. The method of claim 11, wherein the segment is a text document.*

*20. The method of claim 19, wherein the at least one policy limitation comprises printing the text document.*

*21. The method of claim 19, wherein the at least one policy limitation comprises saving or copying the text document.*

*22. The method of claim 12, wherein once the key is rendered unusable, the user has no access to any electronic version of the decrypted content.*

* * * * *